(12) United States Patent
Sturmat et al.

(10) Patent No.: US 11,807,155 B2
(45) Date of Patent: Nov. 7, 2023

(54) METHOD AND DEVICE FOR PERFORMING A WELCOMING ILLUMINATION

(71) Applicant: Volkswagen Aktiengesellschaft, Wolfsburg (DE)

(72) Inventors: Sandra Sturmat, Braunschweig (DE); Franziska Hoppen, Magdeburg (DE); Koukou Nian, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 18/008,308

(22) PCT Filed: May 25, 2021

(86) PCT No.: PCT/EP2021/063821
§ 371 (c)(1),
(2) Date: Dec. 5, 2022

(87) PCT Pub. No.: WO2021/249756
PCT Pub. Date: Dec. 16, 2021

(65) Prior Publication Data
US 2023/0286431 A1    Sep. 14, 2023

(30) Foreign Application Priority Data

Jun. 9, 2020 (DE) ..................... 10 2020 207 188.8

(51) Int. Cl.
*B60Q 1/08* (2006.01)
*F21S 41/657* (2018.01)
*F21S 41/663* (2018.01)

(52) U.S. Cl.
CPC ............ *B60Q 1/085* (2013.01); *F21S 41/657* (2018.01); *F21S 41/663* (2018.01); *B60Q 2400/40* (2013.01); *B60Q 2900/30* (2013.01)

(58) Field of Classification Search
CPC ........ B60Q 1/085; F21S 41/663; F21S 41/657
See application file for complete search history.

(56) References Cited

U.S. PATENT DOCUMENTS 7,537,362 B2 *  5/2009  Kushida ............... B60Q 1/0052
                                                              362/474
9,150,143 B2 * 10/2015  Choi ........................ B60Q 1/08
(Continued)

FOREIGN PATENT DOCUMENTS

DE         10338756 B4     7/2005  ............... B60Q 1/12
DE     102006017234 A1     3/2007  ............... B60Q 1/04
(Continued)

OTHER PUBLICATIONS

German Office Action, Application No. 102020207188.8, 5 pages, dated Feb. 22, 2021.
(Continued)

*Primary Examiner* — Bryon T Gyllstrom
(74) *Attorney, Agent, or Firm* — Slayden Grubert Beard PLLC (57) ABSTRACT

The present invention relates to a method and a device for performing a welcoming illumination in a motor vehicle. Therefore, the problem addressed by the present invention is that of providing a method and a device that allow a welcoming illumination which seems human. According to the invention, a method for performing a welcoming illumination by means of the headlights of a motor vehicle is proposed, each headlight having a pivotable illumination module, the shape of which illumination modules imitates human eyes at least when the illumination modules are illuminated, the method comprising the following steps: —defining an authorization zone having a predefinable radius around the motor vehicle; —registering whether at least one authorized user is within the authorization zone; —starting a first illumination sequence of the welcoming
(Continued)

illumination, in which first illumination sequence the illumination modules pivot, with respect to a vehicle coordinate system, from an idle position directed downward to a horizontally oriented driving position; —determining the position of the authorized user within the authorization zone with respect to the vehicle coordinate system; —starting a second illumination sequence of the welcoming illumination, in which second illumination sequence the illumination modules first pivot toward the registered authorized user and subsequently pivot back to the driving position oriented horizontally and forward.

20 Claims, 8 Drawing Sheets

(56) References Cited

U.S. PATENT DOCUMENTS

| | | | |
|---|---|---|---|
| 9,889,791 | B2 | 2/2018 | Salter et al. |
| 10,217,361 | B2 | 2/2019 | Jung et al. |
| 11,614,214 | B2 * | 3/2023 | Walter ................. F21S 41/657 |
| | | | 362/465 |
| 2006/0125615 | A1 * | 6/2006 | Song ....................... B60Q 1/44 |
| | | | 340/463 |
| 2011/0115375 | A1 * | 5/2011 | Shiratsuchi ............. B60Q 3/16 |
| | | | 315/77 |
| 2014/0140088 | A1 | 5/2014 | Griebel ........................ 362/555 |
| 2016/0096466 | A1 * | 4/2016 | Okumura ............... B60Q 1/247 |
| | | | 315/77 |
| 2017/0129394 | A1 | 5/2017 | Salter et al. .................. 362/509 |
| 2019/0230471 | A1 * | 7/2019 | Golgiri ................... H04W 4/40 |
| 2020/0207261 | A1 * | 7/2020 | Camras ................ B60Q 1/085 |
| 2022/0063481 | A1 * | 3/2022 | Prat .......................... B60Q 1/08 |
| 2022/0107241 | A1 * | 4/2022 | Kanj ..................... F21S 41/153 |

FOREIGN PATENT DOCUMENTS

| | | | | |
|---|---|---|---|---|
| DE | 102010019829 | A1 | 11/2011 | ............... B60Q 1/00 |
| DE | 102012224465 | A1 | 4/2014 | ............... B60Q 1/08 |
| DE | 102012220696 | A1 | 5/2014 | ............... F21S 8/10 |
| DE | 102013224152 | A1 | 5/2015 | ............... B60Q 1/14 |
| DE | 102014213414 | A1 | 1/2016 | ............... B60Q 1/00 |
| DE | 202016106347 | U1 | 2/2017 | ............... B60Q 1/22 |
| DE | 102017124304 | A1 | 6/2018 | ............ B60W 30/08 |
| DE | 102019101796 | A1 | 7/2019 | ............. B60R 25/00 |
| DE | 102018202700 | A1 | 8/2019 | ............... B60Q 1/50 |
| DE | 112014002482 | T5 | 1/2021 | ............... B60Q 1/04 |
| DE | 102020207188 | A1 | 12/2021 | ............... B60Q 1/24 |
| EP | 3067478 | A1 | 9/2016 | ............. E04B 1/343 |
| JP | 2008149784 | A | 7/2008 | ............... B60Q 1/04 |
| KR | 20140079920 | A | 6/2014 | ............. B60Q 11/00 |
| KR | 20150019342 | A | 2/2015 | ............... B60Q 1/06 |
| KR | 20160091585 | A | 8/2016 | ............... B60Q 1/44 |
| WO | 2019/201553 | A1 | 10/2019 | ............... B60Q 1/34 |
| WO | 2021/249756 | A1 | 12/2021 | ............... B60Q 1/08 |

OTHER PUBLICATIONS

International Search Report and Written Opinion, Application No. PCT/EP2021/063821, 10 pages, dated Sep. 13, 2021.

* cited by examiner

METHOD AND DEVICE FOR PERFORMING A WELCOMING ILLUMINATION

CROSS-REFERENCE TO RELATED APPLICATIONS

This application claims priority to German Patent Application No. DE 10 2020 207 188.8, filed on Jun. 9, 2020 with the German Patent and Trademark Office. The contents of the aforesaid patent application are incorporated herein for all purposes.

TECHNICAL FIELD

The present invention relates to a method and a device for performing a welcoming illumination in a motor vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern vehicles have a variety of sensors and devices for outputting and displaying information that allows the user to interact contactlessly with the vehicle within certain limits. In this context, gesture controls, for example, of peripheral devices of the vehicle which allow contactless control of these peripheral devices should be mentioned. Methods and devices for sensor-based control are also known when entering and thus before the actual beginning of a drive. These include, for example, keyless entry into the vehicle, for which the vehicle registers, by means of suitable sensors, whether an authorized user is in the immediate vicinity of the motor vehicle and wishes to enter. In this case, the doors are automatically unlocked so that the authorized user can enter without having to actively unlock the vehicle beforehand.

The growing possibilities of interacting with the motor vehicle has awoken a wish for such motor vehicles to seem "more human" due to suitable external illumination, which simplifies interaction.

SUMMARY

A need exists to provide a method and a device that allow a welcoming illumination that seems somewhat human.

The need is addressed by the method and by the motor vehicle according to the independent claims. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method is provided in which a welcoming illumination is performed with the headlights of the motor vehicle, each headlight having a pivotable illumination module, the shape of which illumination modules imitates human eyes at least when the illumination modules are illuminated. For this purpose, first an authorization zone having a predefinable radius around the vehicle is defined. By means of an authorization device, it is then registered whether at least one authorized user is within the defined authorization zone. Such an authorization device can consist, for example, of a sensor of the vehicle, which sensor registers whether a user within the authorization zone has a contactless key and thus is authorized for entry. Alternatively, a camera device with facial recognition or the like is also conceivable as the authorization device. When an authorized user is registered within the authorization zone, a first illumination sequence of the welcoming illumination starts, in which first illumination sequence the illumination modules pivot, with respect to a vehicle coordinate system, from an idle position oriented downward (i.e., in the negative z-direction) to a horizontally (i.e., in the positive x-direction) oriented driving position. A vehicle coordinate system is understood here to mean a Cartesian and right-hand coordinate system, the x-axis of which is oriented in the driving direction. This gives the viewer the impression that the motor vehicle opens its eyes and thus wakes up. Furthermore, the position of the authorized user within the authorization zone and with respect to the vehicle coordinate system is determined by means of a suitable device. Substantially, the direction from which the authorized user approaches the motor vehicle is established in the process. Depending on this position, a second illumination sequence of the welcoming illumination is started, in which second illumination sequence the illumination modules first pivot in the direction of the registered authorized user and subsequently pivot back to the driving position oriented horizontally and forward. Before the illumination module pivots back, the illumination module for example pauses in the pivoted position before the illumination module pivots back to the driving position oriented forward. This gives the user the impression that the motor vehicle is looking directly at and therefore greeting the user, thereby completing the welcoming illumination that seems human.

In some embodiments, a motor vehicle, is provided with headlights, each having a pivotable illumination module, which illumination modules imitate human eyes when they are illuminated and which are configured to pivot, with respect to a vehicle coordinate system, from an idle position directed downward to a horizontally oriented driving position during a first illumination sequence of a welcoming illumination. In the context of some embodiments, the illumination module is thereby pivoted by a vertically oriented angle of at least 3°, for example of at least 6°. Furthermore, the illumination modules are configured to pivot in the direction of a registered and authorized user during a second illumination sequence of the welcoming illumination. In some embodiments, a horizontal pivoting angle of ±9° is thereby covered. Finally, the illumination modules are configured to pivot back to the driving position oriented horizontally and forward.

Some embodiments are described in the following and with reference to the dependent claims.

In some embodiments, it is provided that the authorization zone has an outer zone and the first illumination sequence starts when the authorized user is registered within the outer zone. In addition, the authorization zone has an inner zone which is located completely within the outer zone, wherein the second illumination sequence starts when the authorized user is registered within the inner zone. This extends the length of the transition between the first illumination sequence, which represents the motor vehicle waking up, and the second illumination sequence, which represents greeting the user, because the second illumination sequence only starts when the addressed user has completely passed through the outer zone. This also humanizes the optical impression of the welcoming illumination.

In some embodiments, it is provided that the inner zone has two regions, namely a region arranged to the left side of the motor vehicle and a region arranged to the right side of the motor vehicle. In front of and behind the vehicle, these regions are at least slightly spaced apart from each other so that pivoting the illumination modules in accordance with the second illumination sequence is blocked if the user approaches the vehicle directly from the front and/or directly from behind. Only when the authorized user chooses a direction—meaning left or right along the vehicle—does the second illumination sequence, in which the illumination modules are pivoted in the direction in which the authorized user is moving, begin.

In some embodiments, the second illumination sequence of the welcoming illumination can start after a predefinable period of time after the first illumination sequence of the welcoming illumination is completed. The progression of the method and the successive performance of the first and second illumination sequences is in this case independent of the definition of an inner zone. Nevertheless, the position of the authorized user is still established/registered so that the illumination module pivots in the direction of the authorized user during the second illumination sequence.

Supplementary to the welcoming illumination by means of the illumination modules mounted in a pivotably movable manner, in some embodiments it is provided that the first illumination sequence of the welcoming illumination comprises switching on and dimming up a position light, wherein the position light comprises light perimeters and a border of the illumination modules. The light perimeters encircle the illumination modules completely or partially or have a V shape that is open toward the sides of the motor vehicle. The border of the illumination modules surrounds the illumination modules completely or at least partially. Both components of the position light enhance the impression of human eyes. The light perimeters at least partially frame the illumination modules mounted in a pivotably movable manner, analogously to the upper and lower eyelids of a human eye, which also enhances the impression of human eyes. In this case, some embodiments with light perimeters that only partially encircle the illumination modules also comprise embodiments in which the light perimeters run only above the illumination modules in order to thus represent an eyebrow and/or an eyelid line. Also provided are light perimeters that are open upward, downward, or toward the middle of the vehicle and/or mimic other visual characteristics of a human eye, such as, in particular, the contour of the eye and/or an eyelash line. The border of the illumination modules, in contrast, represents the iris of a human eye. In some embodiments, the border may extend into the side faces of the illumination modules, where the border can be illuminated in any predefinable pattern with multiple light elements, for example with illuminated lines or rhombuses, thereby mimicking the structure of a human iris.

In some embodiments, the illumination modules have not only the border designed as a position light, but also contain the low beam, which is surrounded completely or at least partially by the border in the manner described previously. The low beam typically has one or more lenses and is switched off during the welcoming illumination and if necessary is active or automatically activated after this.

The described welcoming illumination offers the authorized user not only a virtual effect, but the authorized user is also informed immediately by the progression of the welcoming illumination that the contactless key is functional and ready for use, so that the planned drive can be started immediately.

Additional embodiments are explained below with reference to FIGS. 1 a, b to 7 a, b, each of which show, in pairs, a vehicle in a plan view with an authorized user approaching and a vehicle in a front view with the respectively running illumination sequence, which depends on the position of the registered user.

Specific references to components, process steps, and other elements are not intended to be limiting. Further, it is understood that like parts bear the same or similar reference numerals when referring to alternate FIGS.

Figure 1A:
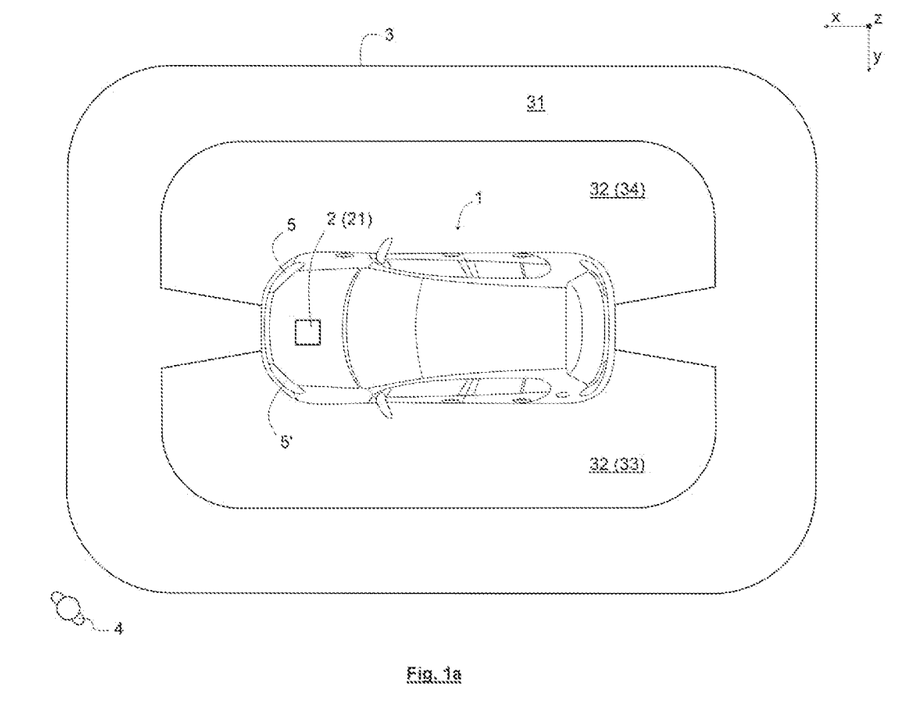
FIGS. 1a, 1b, 2a, 2b, 3a, 3b, 4a, 4b, 5a, 5b, 5c, 6a, 6b, 7a, and 7b show, in pairs, a vehicle in a plan view with an authorized user approaching and a vehicle in a front view with the respectively running illumination sequence, which depends on the position of the registered user.

FIG. 1a shows the plan view of a motor vehicle 1, which registers by means of an authorization device 2 whether an authorized user 4 is within an authorization zone 3. In the present case, the authorization device 2 consists of a sensor 21, which registers whether a contactless key (not shown) is within the authorization zone 3 or not, wherein the authorized user 4 must carry the contactless key with him if a use of the motor vehicle is intended. In the situation shown, the user 4 is outside of the authorization zone 3; therefore, the vehicle 1 is locked and in an idle position.

Figure 1B:
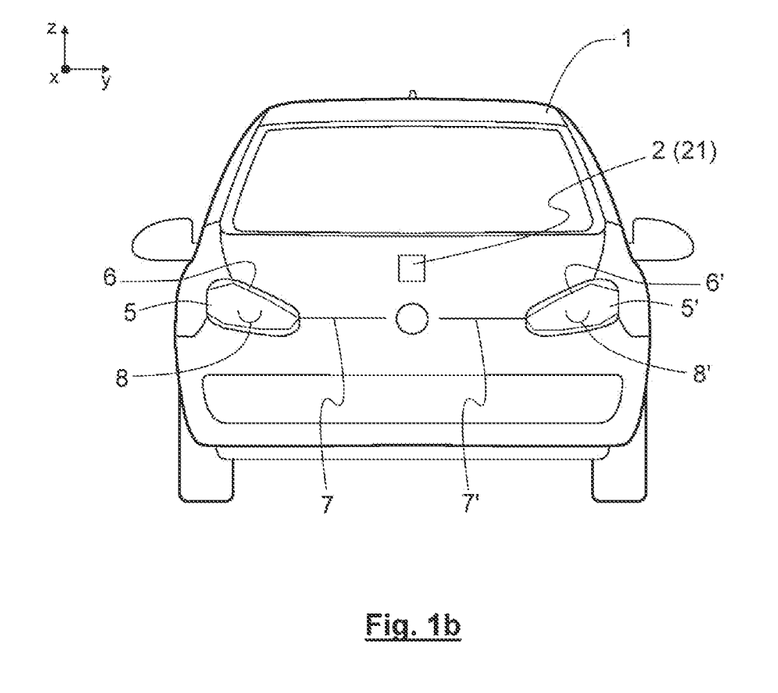

FIG. 1B shows the motor vehicle 1, which is in the idle position, in a front view. The motor vehicle 1 has, in the manner known per se, headlights 5, 5' arranged to the left and right on the front side of the motor vehicle 1. Additionally, the motor vehicle 1 has a position light with light perimeters 6, 6', which are designed in a V shape in the region of the headlights 5, 5' and form a V that is open to the outside so that the headlights 5, 5' are encircled at least in portions by the light perimeters 6, 6'. The light perimeters 6, 6' each transition into a linear portion 7, 7', which portions extend in the horizontal direction and transversely to the longitudinal axis of the motor vehicle 1. In the idle position shown, the light perimeters 6, 6' are not illuminated, which is indicated by the thin line thicknesses of the light perimeters 6, 6' shown.

Finally, the headlights 5, 5' each have an illumination module 8, 8' mounted in a pivotably movable manner, which are pivoted, with respect to a vehicle coordinate system, downward in the idle position shown and are not illuminated. The illumination modules 8, 8' each comprise a low beam and a border, which is associated with the position light.

Figure 2A:
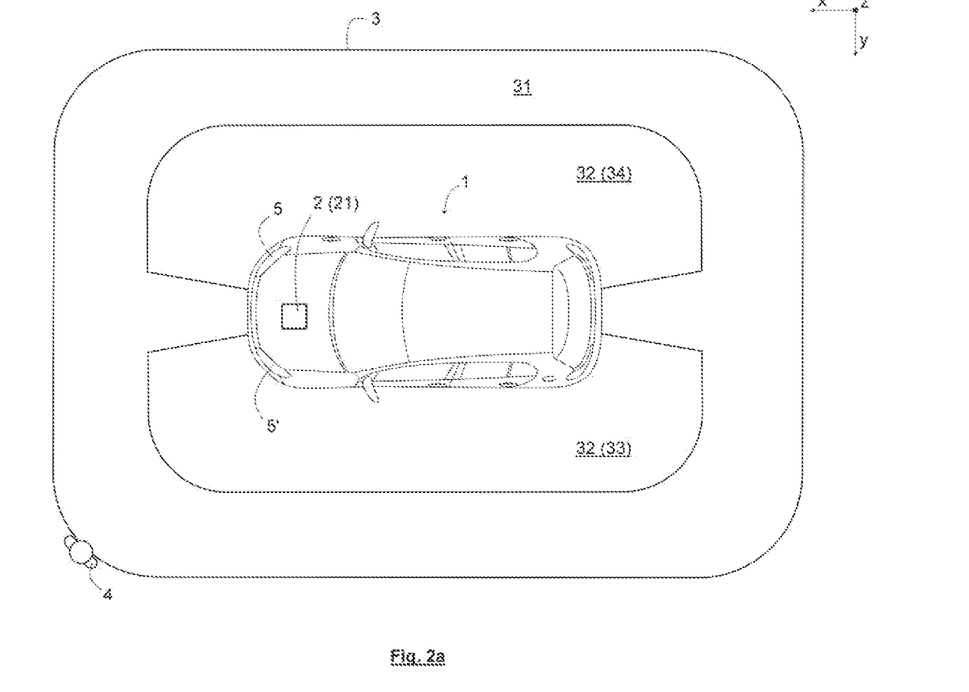
Figure 2B:
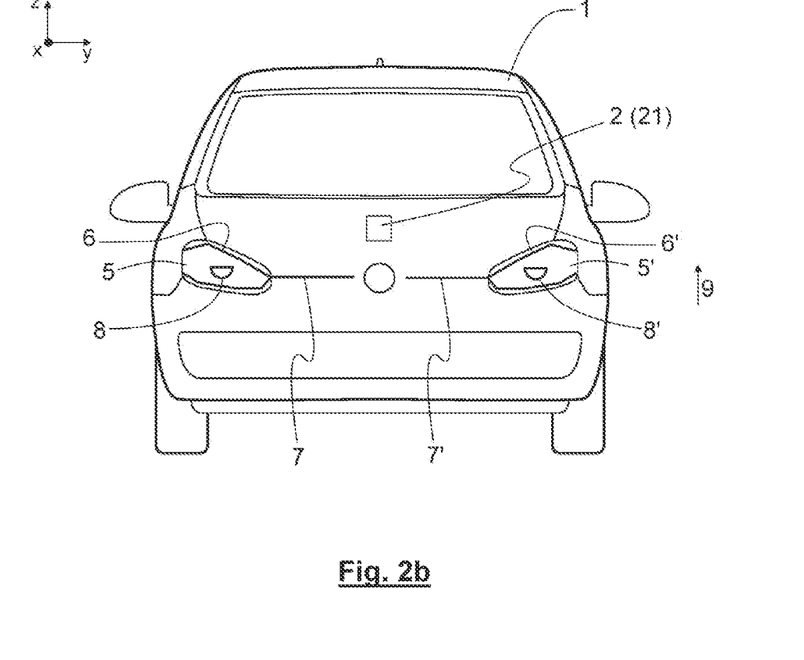

FIG. 2a shows that the authorized user 4 advances into the authorization zone 3, which is registered by the authorization device 2. This starts a welcoming illumination, which comprises multiple illumination sequences. First, a first illumination sequence starts in which the light perimeters 6, 6' are dimmed up and in which the illumination modules 8, 8' mounted in a pivotably movable manner pivot upward in the direction of the arrow 9 from the downwardly directed idle position, wherein the illumination modules 8, 8' or, respectively, their borders gradually dim up and increase the emitted light intensity (FIG. 2b). The increase in the light intensities is shown by the growing line thickness of the light perimeters 6, 6' and the borders of the illumination modules 8, 8'. The authorized user perceives the gradual increase in the light intensity and the pivoting up of the illumination modules 8, 8' as "eyes opening."

Figure 3A:
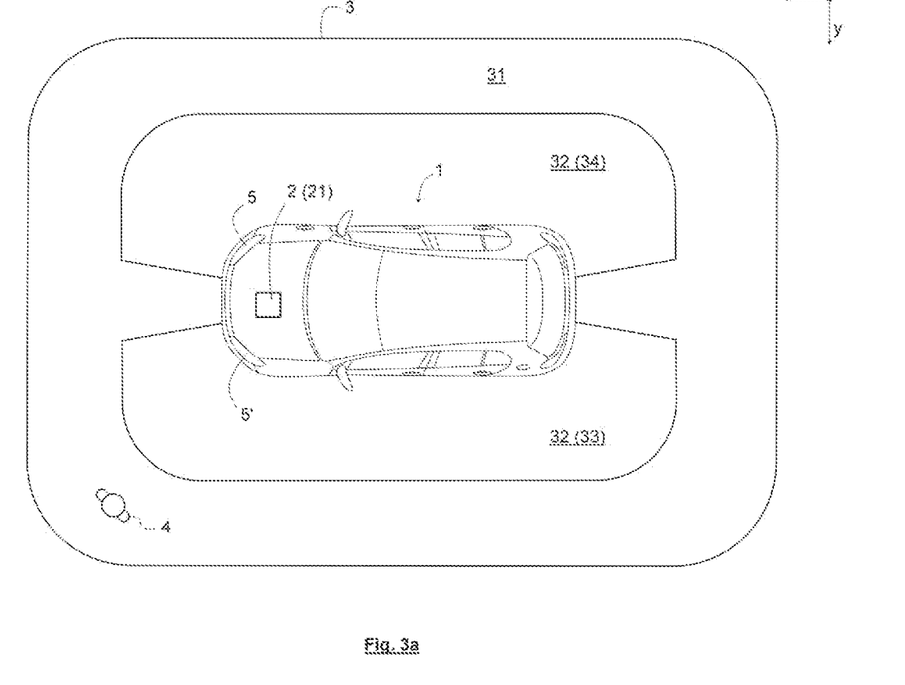
Figure 3B:
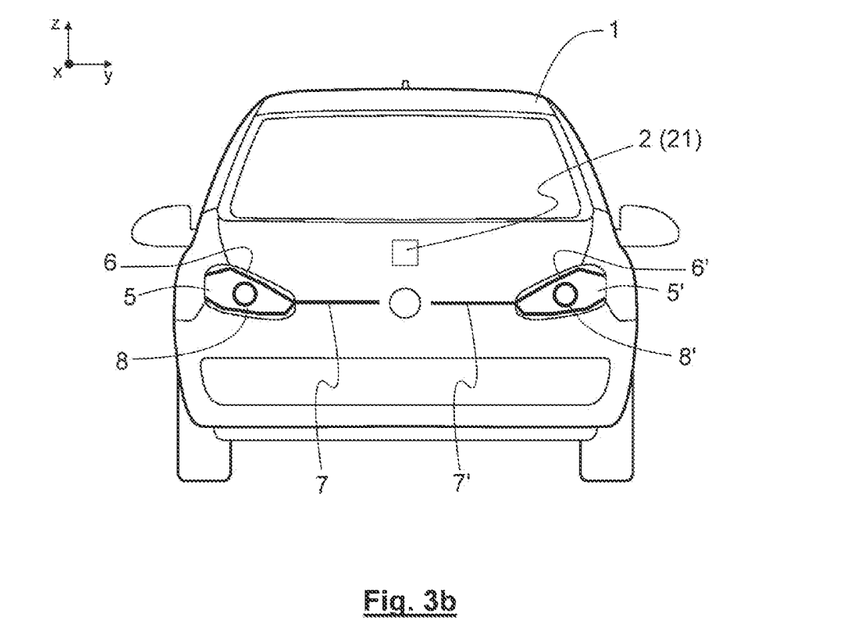

FIG. 3b shows the illumination modules 8, 8' in the horizontally oriented driving position, with which the display of "eyes opening" and thus the first illumination sequence is completed.

Figure 4A:
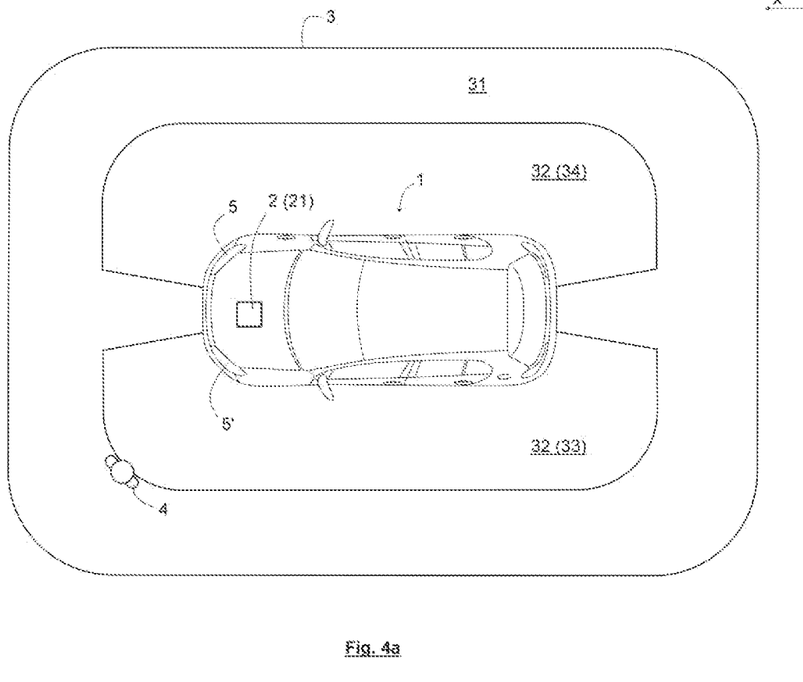
Figure 4B:
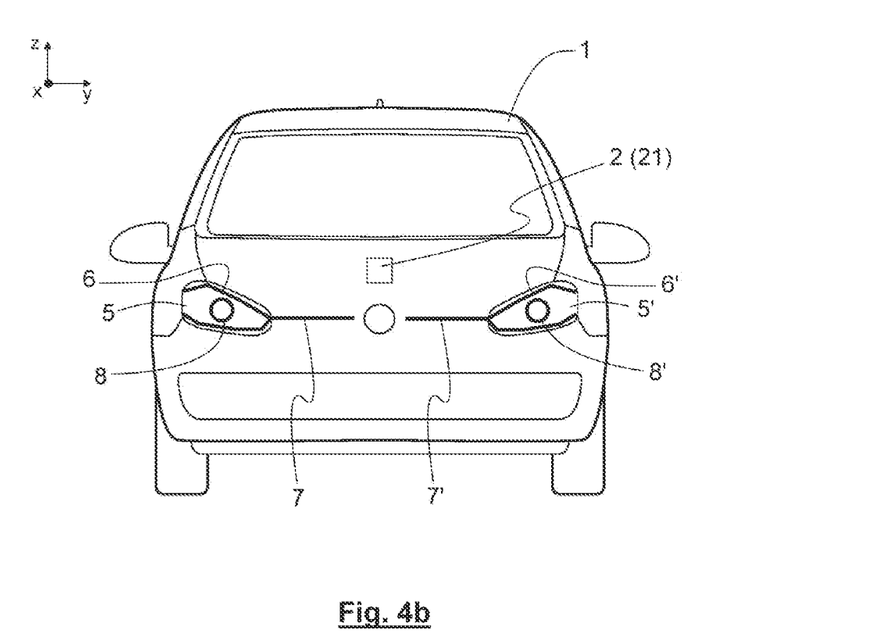

The authorization zone 3 is divided into two regions, namely an outer zone 31 and an inner zone 32 which is completely surrounded by the outer zone 31. The inner zone 32 is in turn also divided into two portions/regions 33, 34 that extend to the left and right sides of the vehicle. To the front side and to the right side of the motor vehicle, these regions 33, 34 of the inner zone 32 are spaced apart from each other so that these intermediate regions are associated with the outer zone 31. When the authorized user 4 is registered within the inner zone 33, as shown in FIG. 4a, a second illumination sequence of the welcoming illumination starts, in which first the position of the authorized user 4 in relation to the motor vehicle 1 is determined. In concrete terms, it is registered whether the authorized user 4 is registered in the left-side or right-side region 33, 34 of the inner zone 32.

Figure 5A:
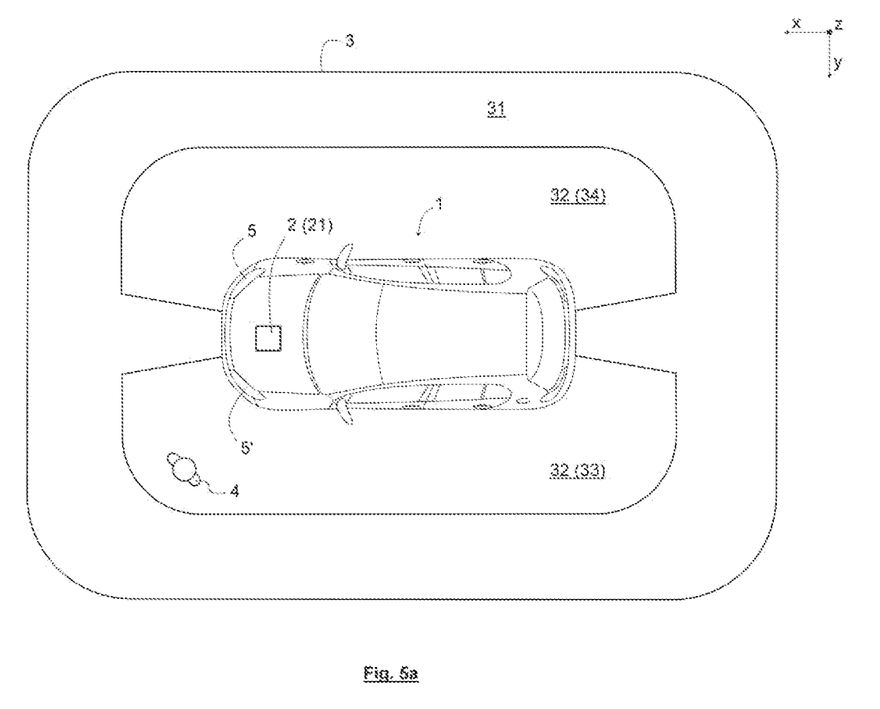
Figure 5B:
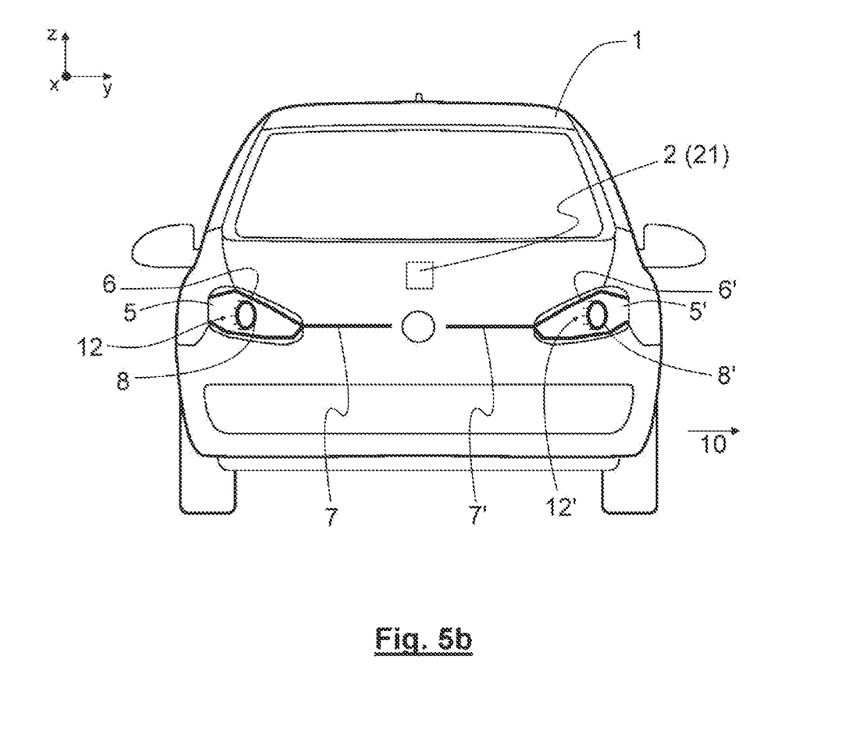
Figure 5C:
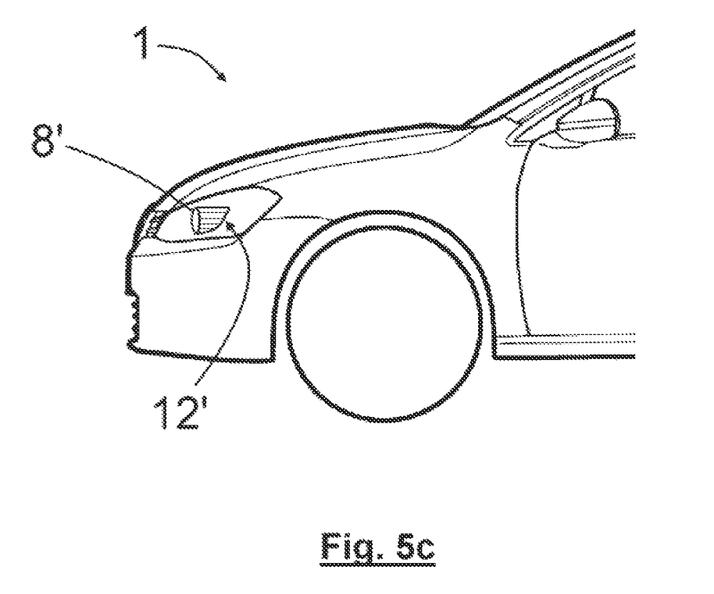
Figure 6A:
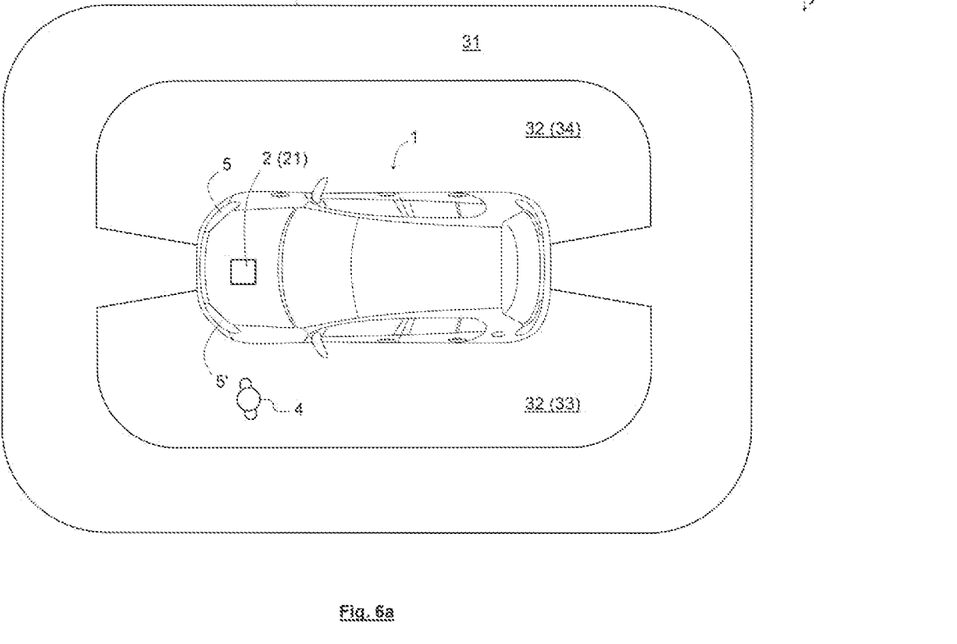
Figure 6B:
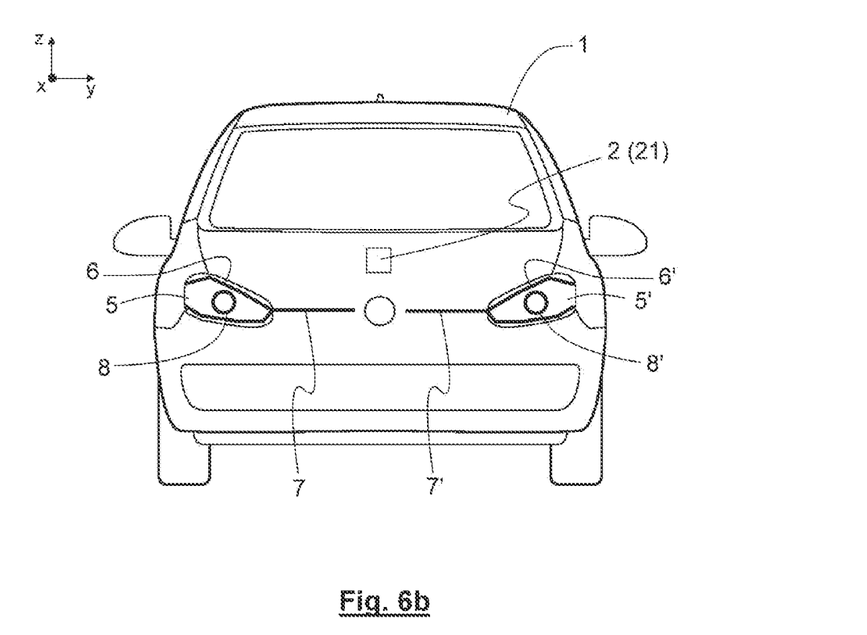

FIG. 5b shows that the pivotably movable illumination modules 8, 8' pivot completely in the direction of the registered authorized user 4 (direction of arrow 10) during the second illumination sequence. As a result, the motor vehicle 1 looks at and greets the authorized user 4 by means of simulated eye contact. FIG. 5b also shows that the illuminated border of the illumination modules 8, 8' extend into the side faces of the illumination modules 8, 8', where the frame is designed as lines (arrows 12, 12'), thereby enhancing the impression of a human iris. FIG. 5c illustrates this embodiment in a side view. Finally, the illumination modules 8, 8' pivot back to the driving position oriented forward (FIG. 6a, b).

Figure 7A:
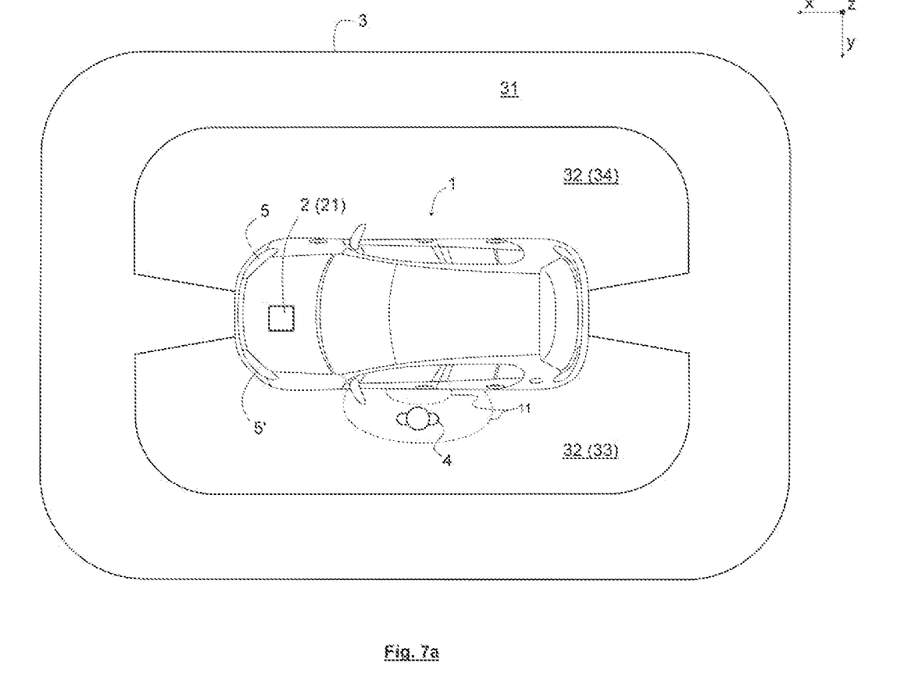
Figure 7B:
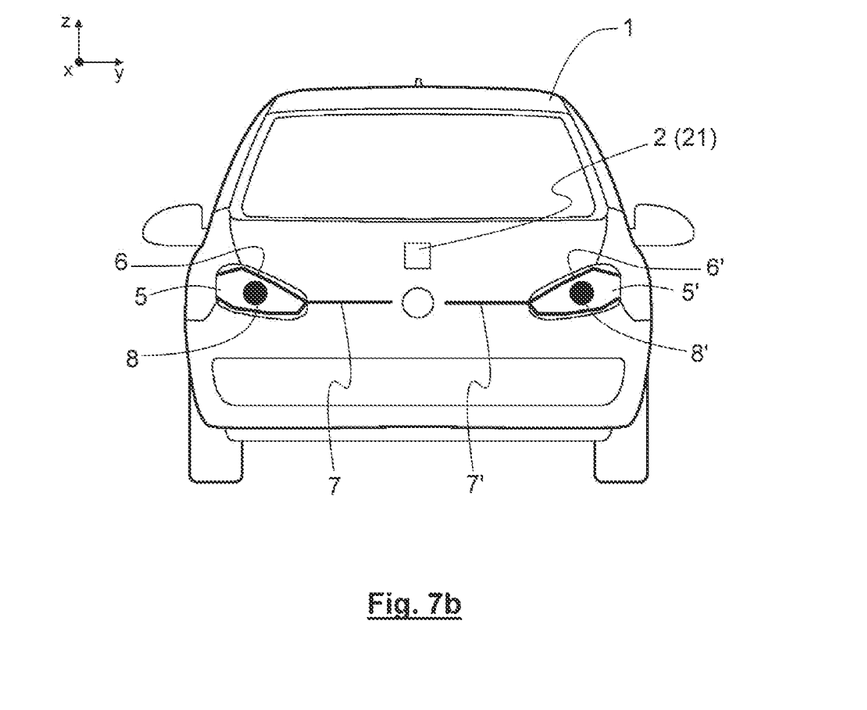

As shown in FIG. 7a, b, upon completion of the welcoming illumination, the authorized user 4 is typically directly in front of the vehicle door. In some embodiments, the welcoming illumination can comprise a ground projection 11, which projects the entry region of the motor vehicle 1 onto the ground. It is also for example provided that, upon completion of the welcoming illumination, the low beam is immediately switched on, which is illustrated by the illumination modules 8, 8' shown in black.

LIST OF REFERENCE NUMERALS

1 Motor vehicle
2 Authorization device
3 Authorization zone
31 Outer zone
32 Inner zone
33 Left-side region of the inner zone
34 Right-side region of the inner zone
4 Authorized user
5, 5' Headlights/Lamps
6, 6' Light perimeters
7, 7' Linear portion
8, 8' Illumination module
9 Direction of arrow (vertical pivoting)
10 Direction of arrow (horizontal pivoting)
11 Ground projection
12, 12' Arrows (continuation of the border as lines)

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for performing a welcoming illumination with the lamps of a motor vehicle, wherein at least two lamps having a pivotable illumination module, the shape of which illumination modules imitates human eyes at least when the illumination modules are illuminated, the method comprising:
    defining an authorization zone having a predefinable radius around the motor vehicle;
    registering whether at least one authorized user is within the authorization zone;
    starting a first illumination sequence of the welcoming illumination, in which first illumination sequence the illumination modules pivot, with respect to a vehicle coordinate system, from an idle position directed downward to a horizontally oriented driving position;
    determining the position of the authorized user within the authorization zone with respect to the vehicle coordinate system;
    starting a second illumination sequence of the welcoming illumination, in which second illumination sequence the illumination modules first pivot in the direction of the registered authorized user and subsequently pivot back to the driving position oriented horizontally and forward.

2. The method of claim 1, wherein the authorization zone has an outer zone, and the first illumination sequence starts when the authorized user is registered within the outer zone.

3. The method of claim 2, wherein the authorization zone has an inner zone, which is located completely within the outer zone, and the second illumination sequence starts when the authorized user is registered within the inner zone.

4. The method of claim 2, wherein the inner zone has two regions, namely a region arranged to the left side of the motor vehicle and a region arranged to the right side of the motor vehicle.

5. The method of claim 2, wherein the first illumination sequence of the welcoming illumination comprises switching on and dimming up a position light, wherein the position light has light perimeters and a border of the illumination modules, wherein the light perimeters:

completely or partially encircle the illumination modules; or have a V shape that is open to the sides of the motor vehicle and the border of the illumination modules completely or partially surrounds the illumination modules, which enhances the impression of human eyes.

6. The method of claim 2, wherein the second illumination sequence of the welcoming illumination starts after a predefinable period of time after the first illumination sequence of the welcoming illumination is completed.

7. The method of claim 1, wherein the authorization zone has an inner zone, which is located completely within the outer zone, and the second illumination sequence starts when the authorized user is registered within the inner zone.

8. The method of claim 7, wherein the inner zone has two regions, namely a region arranged to the left side of the motor vehicle and a region arranged to the right side of the motor vehicle.

9. The method of claim 7, wherein the first illumination sequence of the welcoming illumination comprises switching on and dimming up a position light, wherein the position light has light perimeters and a border of the illumination modules, wherein the light perimeters:

completely or partially encircle the illumination modules; or have a V shape that is open to the sides of the motor vehicle and the border of the illumination modules completely or partially surrounds the illumination modules, which enhances the impression of human eyes.

10. The method of claim 7, wherein the second illumination sequence of the welcoming illumination starts after a predefinable period of time after the first illumination sequence of the welcoming illumination is completed.

11. The method of claim 1, wherein the inner zone has two regions, namely a region arranged to the left side of the motor vehicle and a region arranged to the right side of the motor vehicle.

12. The method of claim 11, wherein the first illumination sequence of the welcoming illumination comprises switching on and dimming up a position light, wherein the position light has light perimeters and a border of the illumination modules, wherein the light perimeters:

completely or partially encircle the illumination modules; or have a V shape that is open to the sides of the motor vehicle and the border of the illumination modules completely or partially surrounds the illumination modules, which enhances the impression of human eyes.

13. The method of claim 11, wherein the second illumination sequence of the welcoming illumination starts after a predefinable period of time after the first illumination sequence of the welcoming illumination is completed.

14. The method of claim 1, wherein the first illumination sequence of the welcoming illumination comprises switching on and dimming up a position light, wherein the position light has light perimeters and a border of the illumination modules, wherein the light perimeters:

completely or partially encircle the illumination modules; or have a V shape that is open to the sides of the motor vehicle and the border of the illumination modules completely or partially surrounds the illumination modules, which enhances the impression of human eyes.

15. The method of claim 14, wherein the second illumination sequence of the welcoming illumination starts after a predefinable period of time after the first illumination sequence of the welcoming illumination is completed.

16. The method of claim 1, wherein the second illumination sequence of the welcoming illumination starts after a predefinable period of time after the first illumination sequence of the welcoming illumination is completed.

17. A vehicle with a device for performing a welcoming illumination, wherein the motor vehicle has lamps, wherein at least two of the lamps comprise a pivotable illumination module, which illumination modules imitate human eyes when the illumination modules are illuminated and which are configured to:

pivot, with respect to a vehicle coordinate system, from an idle position directed downward to a horizontally oriented driving position during a first illumination sequence of a welcoming illumination; and pivot in the direction of a registered and authorized user during a second illumination sequence of the welcoming illumination; and subsequently pivot back to the driving position oriented horizontally and forward.

18. The vehicle of claim 17, comprising an authorization device, which is configured to register an authorized user within an authorization zone and to determine his position within the authorization zone.

19. The vehicle of claim 18, comprising a position light, which has light perimeters and a border of the illumination modules, wherein the light perimeters:

completely or partially encircle the illumination modules; or have a V shape open toward the sides of the motor vehicle and the border of the illumination modules completely or partially surrounds the illumination modules, which enhances the impression of human eyes, wherein the position light is configured to be switched on and dimmed up during the first illumination sequence of the welcoming illumination.

20. The vehicle of claim 17, comprising a position light, which has light perimeters and a border of the illumination modules, wherein the light perimeters:

completely or partially encircle the illumination modules; or have a V shape open toward the sides of the motor vehicle and the border of the illumination modules completely or partially surrounds the illumination modules, which enhances the impression of human eyes, wherein the position light is configured to be switched on and dimmed up during the first illumination sequence of the welcoming illumination.

* * * * *